United States Patent [19]
Boyd et al.

[11] Patent Number: 6,071,839
[45] Date of Patent: Jun. 6, 2000

[54] COLORANT GLASSES

[75] Inventors: David C. Boyd; David A. Tammaro, both of Painted Post, N.Y.

[73] Assignee: Corning Inc., Corning, N.Y.

[21] Appl. No.: 09/383,499

[22] Filed: Aug. 26, 1999

[51] Int. Cl.[7] ............................. C03C 3/085; C03C 3/087
[52] U.S. Cl. ................................ 501/69; 501/64; 501/70; 501/71; 501/73
[58] Field of Search ................... 501/64, 69, 70, 501/71, 72, 73

[56] References Cited

U.S. PATENT DOCUMENTS

| | | | |
|---|---|---|---|
| 2,693,422 | 11/1954 | Duncan et al. | 501/71 |
| 4,521,524 | 6/1985 | Yamashita | 501/64 |
| 4,734,388 | 3/1988 | Cameron et al. | 501/64 |
| 5,108,960 | 4/1992 | Boek et al. | 501/64 |
| 5,242,869 | 9/1993 | Tarumi et al. | 501/64 |
| 5,256,600 | 10/1993 | Pfitzenmaier | 501/4 |
| 5,256,602 | 10/1993 | Danielson et al. | 501/17 |
| 5,422,318 | 6/1995 | Hagg et al. | 501/4 |
| 5,489,558 | 2/1996 | Moffatt et al. | 501/69 |
| 5,491,115 | 2/1996 | Pfitzenmaier et al. | 501/4 |
| 5,492,869 | 2/1996 | Beall et al. | 501/7 |
| 5,508,237 | 4/1996 | Moffatt et al. | 501/69 |
| 5,512,520 | 4/1996 | Pfitzenmaier | 501/7 |
| 5,801,109 | 9/1998 | Nishizawa et al. | 501/66 |
| 5,854,152 | 12/1998 | Kohli et al. | 501/70 |
| 5,854,153 | 12/1998 | Kohli | 501/70 |
| 5,888,917 | 3/1999 | Kawaguchi et al. | 501/71 |

FOREIGN PATENT DOCUMENTS

| | | | |
|---|---|---|---|
| 44-24422 | 10/1969 | Japan | 501/71 |

*Primary Examiner*—Mark L. Bell
*Assistant Examiner*—David Sample
*Attorney, Agent, or Firm*—Angela N. Nwaneri; Patrick Pacella

[57] ABSTRACT

These color television (CTV) panel tint glasses involve using base CTV panel glass compositions with enhanced levels of Ni and Co colorants. The approach uses non-lead CTV panel glass compositions with high levels of Ni and Co oxide as colorant glasses for tinting clear CTV non-lead panel glass. Nickel oxide was varied from 2 to 18%, while cobalt oxide was varied from 0.2 to 2%. A preferred range of compositions with cobalt oxide levels below 1% and nickel oxide levels below 10% was found to be very acceptable for CTV panel colorants.

16 Claims, No Drawings

COLORANT GLASSES

TECHNICAL FIELD

This invention relates to color television (CTV) panel glasses.

BACKGROUND ART

The glass industry successfully has used colorants in past applications for consumer products. The applications, however, usually require production of several tints from the same glass tank. Also, colorant technology historically has led to much higher defect levels in consumer ware. Defect levels often were on the order of tens to hundreds of defects per cubic inch. For example, Corning Visions™ specifications were at one time as high as 300 defects/cubic inch Color television panel glasses cannot tolerate levels above the $10^{-4}$ to $9 \times 10^{-4}$ defects/cubic inch regime. Bonded oxides and frit materials used for past consumer applications were not suitable for CTV panels. Past experience with this approach proved marginally successful, with color distribution (stirring) as the main problem. Blister levels below 1/cubic inch were achieved, hence not approaching the current required levels of $10^{-4}$ per cubic inch.

DISCLOSURE OF INVENTION

The inventive approach here involves using base CTV panel glass compositions with enhanced levels of Ni and Co colorants. Color television panel production would benefit from the ability to rapidly change tints. Currently, tint changes require a minimum four-day tank turnover time. Future applications require the process to produce several tints from the same glass tank. New products may also require a range of transmissions from 85% to the current 42% products. Adding colorants at the forehearth would shorten tint changes to hours vs. days.

The approach here involved using non-lead CTV panel glass compositions with high levels of Ni and Co oxide as colorant glasses for tinting clear CTV non-lead panel glass. Nickel oxide was varied from 2 to 18%, while cobalt oxide was varied from 0.2 to 2%. A preferred range of compositions with cobalt oxide levels below 1% and nickel oxide levels below 10% was found to be very acceptable for CTV panel colorants. The acceptable range was tested using physical properties and defect evaluation techniques.

BEST MODE OF CARRYING OUT INVENTION

Generally, the colored, lead-free silicate glass of this invention are for flat panel displays. The compositions comprise, expressed in terms of weight percent on an oxide basis:

| Oxides | Weight Percent |
|---|---|
| $SiO_2$ | 35–65 |
| $Al_2O_3$ | 1–3 |
| $Na_2O$ | 3–12 |
| $K_2O$ | 3–10 |
| MgO | 0–1 |
| CaO | 0–2 |
| SrO | 3–12 |
| BaO | 3–12 |
| PbO | 0.00 |
| $ZrO_2$ | 1–4 |
| $Co_3O_4$ | 0.2–2 |
| NiO | 2–19.47. |

Preferably, the amount of $Co_3O_4$ ranges from 0.2 to 1 weight percent and the amount of NiO ranges from 2 to 10 weight percent.

More preferably, the compositions have the following composition:

| Oxides | Weight Percent |
|---|---|
| $SiO_2$ | 35–60 |
| $Al_2O_3$ | 1.5–2.5 |
| $Na_2O$ | 5–10 |
| $K_2O$ | 5–9 |
| MgO | 0–0.5 |
| CaO | 1–2 |
| SrO | 5–10 |
| BaO | 5–10 |
| PbO | 0.00 |
| $ZrO_2$ | 2–3 |
| $Co_3O_4$ | 0.2–1 |
| NiO | 2–10 |

The glasses also may contain various other components. For example, the glasses may further include 0–5 wt. % of other oxides, such as $Li_2O$, $TiO_2$, $CeO_2$, $Sb_2O_3$, F, $Fe_2O_3$, Cl, $SO_3$, $P_2O_5$ or $La_2O_3$.

EXAMPLE I

Colorant Glass Compositions

We prepared a series of ten glass melts for a range of properties we deemed necessary for colorant glass addition to panel forehearths. The compositions we chose are listed as Table I and Table II below and compared with standard, clear 42% transmission panel glass. All colorant glasses contained the same ratio of $NiO/Co_3O_4$ as found in the standard. This ratio was used so that a mass of colorant added to a clear base glass could produce a 42% transmission glass for any of the series. The clear base glass was used to better display defects associated with mixing in dark colorant against a clear background.

TABLE 1

| | Std. | First 5 Melts | | | | |
|---|---|---|---|---|---|---|
| | | Weight Percent | | | | |
| | DCB | DDX | DDY | DDZ | DEA | DEB |
| Oxides | | | | | | |
| $SiO_2$ | 59.39 | 55.66 | 53.57 | 53.70 | 49.05 | 46.90 |
| $Al_2O_3$ | 2.28 | 2.37 | 2.37 | 2.26 | 2.37 | 2.37 |
| $Li_2O$ | 0.01 | 0.01 | 0.01 | 0.01 | 0.01 | 0.01 |
| $Na_2O$ | 7.86 | 8.16 | 8.16 | 7.77 | 8.18 | 8.18 |
| $K_2O$ | 7.61 | 7.90 | 7.90 | 7.53 | 7.92 | 7.92 |
| MgO | 0.28 | 0.29 | 0.29 | 0.27 | 0.29 | 0.29 |
| CaO | 1.03 | 1.07 | 1.07 | 1.02 | 1.08 | 1.08 |
| SrO | 8.57 | 8.90 | 8.90 | 8.48 | 8.92 | 8.92 |
| BaO | 8.97 | 9.24 | 9.24 | 8.80 | 9.26 | 9.26 |
| PbO | 0.00 | 0.00 | 0.00 | 0.00 | 0.00 | 0.00 |

TABLE 1-continued

First 5 Melts

| | Std. | Weight Percent | | | | |
|---|---|---|---|---|---|---|
| | DCB | DDX | DDY | DDZ | DEA | DEB |
| $ZrO_2$ | 2.49 | 2.58 | 2.58 | 2.46 | 2.59 | 2.59 |
| ZnO | 0.00 | 0.00 | 0.00 | 0.00 | 0.00 | 0.00 |
| $TiO_2$ | 0.45 | 0.47 | 0.46 | 0.42 | 0.45 | 0.44 |
| $CeO_2$ | 0.42 | 0.44 | 0.44 | 0.41 | 0.44 | 0.44 |
| $Sb_2O_3$ | 0.46 | 0.48 | 0.48 | 0.45 | 0.48 | 0.48 |
| $Co_3O_4$ | 0.002 | 0.24 | 0.47 | 0.67 | 0.95 | 1.18 |
| NiO | 0.02 | 2.02 | 3.90 | 5.57 | 7.82 | 9.76 |
| Fluorine | 0.06 | 0.06 | 0.06 | 0.06 | 0.06 | 0.06 |
| $Fe_2O_3$ | 0.04 | 0.03 | 0.03 | 0.04 | 0.05 | 0.06 |
| Chlorine | 0.01 | 0.01 | 0.01 | 0.01 | 0.01 | 0.01 |
| Sulfate | 0.04 | 0.04 | 0.04 | 0.04 | 0.04 | 0.04 |
| $P_2O_5$ | 0.01 | 0.01 | 0.01 | 0.01 | 0.01 | 0.01 |
| $La_2O_3$ | 0.02 | 0.02 | 0.02 | 0.02 | 0.02 | 0.02 |
| $V_2O_5/Cr_2$ | 0.00 | 0.00 | 0.00 | 0.00 | 0.00 | 0.00 |
| Totals | 100.01 | 100.00 | 100.00 | 100.00 | 100.00 | 100.00 |

TABLE 2

Second 5 Melts

| | Std. | Weight Percent | | | | |
|---|---|---|---|---|---|---|
| | DCB | DEC | DED | DEE | DEF | DEG |
| Oxides | | | | | | |
| $SiO_2$ | 59.39 | 44.75 | 42.60 | 40.45 | 38.31 | 36.17 |
| $Al_2O_3$ | 2.28 | 2.37 | 2.37 | 2.38 | 2.38 | 2.38 |
| $Li_2O$ | 0.01 | 0.01 | 0.01 | 0.01 | 0.01 | 0.01 |
| $Na_2O$ | 7.86 | 8.17 | 8.17 | 8.16 | 8.16 | 8.15 |
| $K_2O$ | 7.61 | 7.91 | 7.91 | 7.91 | 7.90 | 7.90 |
| MgO | 0.28 | 0.29 | 0.29 | 0.29 | 0.29 | 0.29 |
| CaO | 1.03 | 1.08 | 1.08 | 1.08 | 1.08 | 1.08 |
| SrO | 8.57 | 8.91 | 8.91 | 8.90 | 8.90 | 8.89 |
| BaO | 8.97 | 9.25 | 9.25 | 9.24 | 9.24 | 9.23 |
| PbO | 0.00 | 0.00 | 0.00 | 0.00 | 0.00 | 0.00 |
| $ZrO_2$ | 2.49 | 2.59 | 2.59 | 2.58 | 2.58 | 2.58 |
| ZnO | 0.00 | 0.00 | 0.00 | 0.00 | 0.00 | 0.00 |
| $TiO_2$ | 0.45 | 0.42 | 0.41 | 0.39 | 0.38 | 0.36 |
| $CeO_2$ | 0.42 | 0.44 | 0.44 | 0.44 | 0.44 | 0.44 |
| $Sb_2O_3$ | 0.46 | 0.48 | 0.48 | 0.48 | 0.48 | 0.48 |
| $Co_3O_4$ | 0.002 | 1.42 | 1.65 | 1.89 | 2.12 | 2.36 |
| NiO | 0.02 | 11.71 | 13.65 | 15.59 | 17.53 | 19.47 |
| Fluorine | 0.06 | 0.06 | 0.06 | 0.06 | 0.06 | 0.06 |
| $Fe_2O_3$ | 0.04 | 0.06 | 0.07 | 0.08 | 0.09 | 0.09 |
| Chlorine | 0.01 | 0.01 | 0.01 | 0.01 | 0.01 | 0.01 |
| Sulfate | 0.04 | 0.04 | 0.04 | 0.04 | 0.04 | 0.04 |
| $P_2O_5$ | 0.01 | 0.01 | 0.01 | 0.01 | 0.01 | 0.01 |
| $La_2O_3$ | 0.02 | 0.02 | 0.02 | 0.02 | 0.02 | 0.02 |
| $V_2O_5/Cr_2$ | 0.00 | 0.00 | 0.00 | 0.00 | 0.00 | 0.00 |
| Totals | 100.01 | 100.00 | 100.00 | 100.00 | 100.00 | 100.00 |

EXAMPLE II

Crucible Melting Tests

Annealed in silica crucibles.

The first crucible melting experiment involved sprinkling 30 grams/crucible of DDX on top of clear Std. base glass in a silica crucible. After melting at 1550° C., the glass was held at 1190° C., the estimated maximum temperature of a standard forehearth. The melts, although annealed overnight, cracked apart in the annealing oven. Further testing was completed using poured glass samples. This test showed that the colorant glass melted completely, but did not sink into the melt.

Annealed in silica crucibles, optical pours.

The same melting procedure as above was used, but with addition of a more concentrated colorant. Colorant glass particles were manually stirred in using fused silica rods, however at the 1190° C. The DEF colorant was segregated by mesh sizes before sprinkling into the five crucibles. Optical poured patty samples were made for defect evaluation via microscopy.

Again, the colorants were observed to "float" at the top of the crucible melts, but again, the colorant glass did melt. Microscopy showed that some Ni and Co containing stone defects were present. Blisters and cord were also present. Particle sizes of −20 to +40 mesh and below melted with no stone defects.

Annealed in silica crucibles, optical pours blank included.

The next crucible melt employed DEE as the colorant to mix with the Std. base glass.

Nickel and cobalt stones were not associated with the color streaks in this series. Mesh sizes of −2 to +40 and below were found free of stone defects. No stones and cord were found in the control sample, with no added colorant. Use of higher particle size (−5 to +10 mesh) on a remelt showed no stones and cord detected. This was possible after soaking the sample for 30 minutes after stirring. In previous melts, the time was 5 minutes.

A typical nickel-cobalt crystallization defect shows up in microscopy as crystals or cords within a color streak.

EXAMPLE III

Analysis of Colorant Glasses

Microscopy results indicated that only the DEF composition contained solid inclusions in the as-melted glass. The other colorant glasses: DDX through DEE contained cords, but were free of crystalline solids.

EXAMPLE IV

Induction Melts With Poured Patties

After evaluation of the crucible melts, we concluded that a higher quality melting process was required to better judge defect levels potentially arising from colorant addition. An induction melter was used for this purpose. The melter we used was a platinum crucible and stirrer with a bottom delivery orifice for 4 inch square patty samples. We arrived at the following procedure which minimized defects in melts of base glass with or without colorant additions:

Use Std. (approx. 8,000 grams) drigaged cullet in melter.

Melt at approx. 1400° C.

Hold at 1190° C. for 1 hour.

Add colorant (approx. 20 grams) and hold for 5 min.

Stir at 1190° C. for 5 min. at 15 rpm.

Wait 8 min. after stirring to deliver to 4×4 patties at 1190° C.

Analysis of Defects

Defects Counted.

There were a total of 12 patties available from each melt. In each case, a representative selection of 4 patties was taken for optical microscopic image analysis. After melting, 3 inch diameter 0.5 mm thick discs were optically polished for examination of defects present. The number of defects per cubic centimeter for the first set, a clear base glass melt without colorant is shown in Table 3. Table 4 shows another Std. melt, this time without the stirring at high temperature. Table 5 shows Std. plus DEA colorant under the above conditions, without stirring a high temperature. This represents the best quality glass obtained in experimental melting.

TABLE 3

Std., Induction Melted, Stirred at 1400° C.

Set 1 Std. Clear CTV Panel

|  | Sample 3 | Sample 7 | Sample 9 | Sample 11 | |
|---|---|---|---|---|---|
| Mean Defect Count | 99.53 | 87.71 | 83.08 | 100.09 | |
| Standard Deviation | 20.43 | 19.87 | 17.57 | 21.48 | |
| Minimum | 7 | 2 | 3 | 10 | |
| Maximum | 90 | 79 | 69 | 117 | |
| Defect Count | 2339 | 2105 | 1994 | 2202 | 8640 |
| # of Fields | 47 | 48 | 48 | 44 | |
| Volume Measured Per Field (cm$^3$) | 23.5 | 24 | 24 | 22 | 93.5 |
| Defects Per cm$^3$ | | | | | 92.41 |

TABLE 4

Std., Induction Melted Drigaged Cullet, No Stir at 1400° C.

Set 2 Std. Clear CTV Panel

|  | Sample 3 | Sample 7 | Sample 9 | Sample 11 | |
|---|---|---|---|---|---|
| Mean Defect Count | 26.85 | 96.88 | 28.87 | 27.67 | |
| Standard Deviation | 7.64 | 95.44 | 6.66 | 4.91 | |
| Minimum | 1 | 2 | 2 | 1 | |
| Maximum | 38 | 438 | 33 | 23 | |
| Defect Count | 631 | 2325 | 664 | 520 | 4140 |
| # of Fields | 47 | 48 | 46 | 48 | |
| Volume Measured Per Field (cm$^3$) | 23.5 | 24 | 23 | 24 | 94.5 |
| Defects Per cm$^3$ | | | | | 43.81 |

TABLE 5

Std., Induction Melted Drigaged Cullett
Plus DEA, -20 to +40 Mesh, No Stir at 1400° C.

Set 3 DDS W/Colorant Added DEA

|  | Sample 4 | Sample 7 | Sample 9 | Sample 11 | |
|---|---|---|---|---|---|
| Mean Defect Count | 11.13 | 5.96 | 7.92 | 8.51 | |
| Standard Deviation | 3.28 | 2.66 | 2.55 | 2.62 | |
| Minimum | 0 | 0 | 0 | 0 | |
| Maximum | 13 | 10 | 11 | 13 | |
| Defect Count | 267 | 143 | 190 | 200 | 800 |
| # of Fields | 48 | 48 | 48 | 47 | |
| Volume Measured Per Field (cm$_3$) | 24 | 24 | 24 | 23.5 | 95.5 |
| Defects Per cm$_3$ | | | | | 8.38 |

Defect Size Distributions, Bubble Compositions

The defects counted above were also sized using optical microscopy/image analysis techniques. The distributions of defects with sizes above 35 microns were plotted. The defect size distributions did not distinguish between colorant added and non-colorant added melts. Some of the defects from the unpolished discs from the two melts were analyzed via mass spectrometry for composition. The bubble compositions between colorant and non-colorant added melts were not distinguishable. There were primarily air source bubbles with varying amounts of carbon dioxide in both bubble sets.

EXAMPLE IV

Gradient Boat Tests

Since induction melted defects obtained from colorant added vs. non-colorant added glass could not be distinguished, gradient boat testing was tried. Gradient boats were used to melt the base glass, then sprinkle colorant on top of the boat and remelt for varying amounts of time. The procedural details were as follows:

Heat base glass strip in gradient furnace (900 min-1250° C. max) for 60 minutes.

Remove boat and sprinkle on colorant.

Return to gradient furnace and continue to heat for 5, 10, 15, 30, 120 and 480 minutes (six (6) separate tests).

Results from the testing indicated no reaction between the base glass and the colorant glass. Although there was some blistering effect in the base glass alone, no defects associated with addition of the colorant and/or air entrapment could be found.

The compositions investigated herein, with cobalt oxides ranging from 0–2% and nickel oxides ranging from 1–10%, for non-lead CTV panel glass forehearth colorant addition applications have been shown to be easily melted into CTV panel glass at forehearth temperatures. No defects beyond those observed for the non-lead panel glass without colorants added were observed in induction melt lab trials.

The results involved testing a wide composition range of Ni and Co oxide containing CTV panel (non-lead) compositions. Nickel oxide was varied from 2 to 18%, while cobalt oxide was varied from 0.2 to 2%. A preferred range of compositions, with cobalt oxide levels below 1% and nickel oxide levels below 10% was found to be acceptable for CTV panel colorant addition work.

Composition and analytical work involved in development of the various colorant glasses is the focus of this report. The research and development work concluded with a colorant choice that produced no added defects beyond those observable in melting a non-colored base glass composition. Other compositions, DEX, DEY and DEZ were also acceptable candidates for colorant additions, and represented the range of cobalt and nickel oxides within the glass family that were usable for this application.

In addition to these embodiments, persons skilled in the art can see that numerous modifications and changes may be made to the above invention without departing from the intended spirit and scope thereof.

We claim:

1. A colored, lead-free silicate glass composition for flat panel display comprising, expressed in terms of weight percent on an oxide basis:

| Oxides | Weight Percent |
|---|---|
| SiO$_2$ | 35–65 |
| Al$_2$O$_3$ | 1–3 |
| Na$_2$O | 3–12 |
| K$_2$O | 3–10 |
| MgO | 0–1 |
| CaO | 0–2 |
| SrO | 3–12 |
| BaO | 3–12 |
| PbO | 0.00 |
| ZrO$_2$ | 1–4 |
| Co$_3$O$_4$ | 0.2–2 |
| NiO | 2–19.47. |

2. A composition according to claim 1 wherein the amount of Co$_3$O$_4$ ranges from 0.2 to 1 weight percent and the amount of NiO ranges from 2 to 10 weight percent.

3. A composition according to claim 1 having the composition:

| Oxides | Weight Percent |
| --- | --- |
| $SiO_2$ | 35–60 |
| $Al_2O_3$ | 1.5–2.5 |
| $Na_2O$ | 5–10 |
| $K_2O$ | 5–9 |
| MgO | 0–0.5 |
| CaO | 1–2 |
| SrO | 5–10 |
| BaO | 5–10 |
| PbO | 0.00 |
| $ZrO_2$ | 2–3 |
| $Co_3O_4$ | 0.2–1 |
| NiO | 2–10. |

4. A glass composition according to claim 1 having the composition:

| Oxides | Weight Percent |
| --- | --- |
| $SiO_2$ | 55.66 |
| $Al_2O_3$ | 2.37 |
| $Na_2O$ | 8.16 |
| $K_2O$ | 7.90 |
| MgO | 0.29 |
| CaO | 1.07 |
| SrO | 8.90 |
| BaO | 9.24 |
| PbO | 0.00 |
| $ZrO_2$ | 2.58 |
| $Co_3O_4$ | 0.24 |
| NiO | 2.02. |

5. A glass composition according to claim 1 having the composition:

| Oxides | Weight Percent |
| --- | --- |
| $SiO_2$ | 53.57 |
| $Al_2O_3$ | 2.37 |
| $Na_2O$ | 8.16 |
| $K_2O$ | 7.90 |
| MgO | 0.29 |
| CaO | 1.07 |
| SrO | 8.90 |
| BaO | 9.24 |
| PbO | 0.00 |
| $ZrO_2$ | 2.58 |
| $Co_3O_4$ | 0.47 |
| NiO | 3.90. |

6. A glass composition according to claim 1 having the composition:

| Oxides | Weight Percent |
| --- | --- |
| $SiO_2$ | 53.70 |
| $Al_2O_3$ | 2.26 |
| $Na_2O$ | 7.77 |
| $K_2O$ | 7.53 |
| MgO | 0.27 |
| CaO | 1.02 |
| SrO | 8.48 |
| BaO | 8.80 |
| PbO | 0.00 |

-continued

| Oxides | Weight Percent |
| --- | --- |
| $ZrO_2$ | 2.46 |
| $Co_3O_4$ | 0.67 |
| NiO | 5.57. |

7. A glass composition according to claim 1 having the composition:

| Oxides | Weight Percent |
| --- | --- |
| $SiO_2$ | 49.05 |
| $Al_2O_3$ | 2.37 |
| $Na_2O$ | 8.18 |
| $K_2O$ | 7.92 |
| MgO | 0.29 |
| CaO | 1.08 |
| SrO | 8.92 |
| BaO | 9.26 |
| PbO | 0.00 |
| $ZrO_2$ | 2.59 |
| $Co_3O_4$ | 0.95 |
| NiO | 7.82. |

8. A glass composition according to claim 1 having the composition:

| Oxides | Weight Percent |
| --- | --- |
| $SiO_2$ | 46.90 |
| $Al_2O_3$ | 2.37 |
| $Na_2O$ | 8.18 |
| $K_2O$ | 7.92 |
| MgO | 0.29 |
| CaO | 1.08 |
| SrO | 8.92 |
| BaO | 9.26 |
| PbO | 0.00 |
| $ZrO_2$ | 2.59 |
| $Co_3O_4$ | 1.18 |
| NiO | 9.76. |

9. A glass composition according to claim 1 having the composition:

| Oxides | Weight Percent |
| --- | --- |
| $SiO_2$ | 44.75 |
| $Al_2O_3$ | 2.37 |
| $Na_2O$ | 8.17 |
| $K_2O$ | 7.91 |
| MgO | 0.29 |
| CaO | 1.08 |
| SrO | 8.91 |
| BaO | 9.25 |
| PbO | 0.00 |

-continued

| Oxides | Weight Percent |
|---|---|
| $ZrO_2$ | 2.59 |
| $Co_3O_4$ | 1.42 |
| NiO | 11.71. |

10. A glass composition according to claim 1 having the composition:

| Oxides | Weight Percent |
|---|---|
| $SiO_2$ | 42.60 |
| $Al_2O_3$ | 2.37 |
| $Na_2O$ | 8.17 |
| $K_2O$ | 7.91 |
| MgO | 0.29 |
| CaO | 1.08 |
| SrO | 8.91 |
| BaO | 9.25 |
| PbO | 0.00 |
| $ZrO_2$ | 2.58 |
| $Co_3O_4$ | 1.65 |
| NiO | 13.65. |

11. A glass composition according to claim 1 having the composition:

| Oxides | Weight Percent |
|---|---|
| $SiO_2$ | 40.45 |
| $Al_2O_3$ | 2.38 |
| $Na_2O$ | 8.16 |
| $K_2O$ | 7.91 |
| MgO | 0.29 |
| CaO | 1.08 |
| SrO | 8.90 |
| BaO | 9.24 |
| PbO | 0.00 |
| $ZrO_2$ | 2.58 |
| $Co_3O_4$ | 1.89 |
| NiO | 15.59. |

12. A glass composition according to claim 1 having the composition:

| Oxides | Weight Percent |
|---|---|
| $SiO_2$ | 38.31 |
| $Al_2O_3$ | 2.38 |
| $Na_2O$ | 8.16 |
| $K_2O$ | 7.90 |
| MgO | 0.29 |
| CaO | 1.08 |
| SrO | 8.90 |
| BaO | 9.24 |
| PbO | 0.00 |
| $ZrO_2$ | 2.58 |
| $Co_3O_4$ | 2.12 |
| NiO | 17.53. |

13. A glass composition according to claim 1 having the composition:

| Oxides | Weight Percent |
|---|---|
| $SiO_2$ | 36.17 |
| $Al_2O_3$ | 2.38 |
| $Na_2O$ | 8.15 |
| $K_2O$ | 7.90 |
| MgO | 0.29 |
| CaO | 1.08 |
| SrO | 8.89 |
| BaO | 9.23 |
| PbO | 0.00 |
| $ZrO_2$ | 2.58 |
| $Co_3O_4$ | 2.36 |
| NiO | 19.47. |

14. A substrate for a panel display device wherein said substrate comprises a glass having a colored, lead-free silicate glass composition comprising, expressed in terms of weight percent on an oxide basis:

| Oxides | Weight Percent |
|---|---|
| $SiO_2$ | 35–65 |
| $Al_2O_3$ | 1–3 |
| $Na_2O$ | 3–12 |
| $K_2O$ | 3–10 |
| MgO | 0–1 |
| CaO | 0–2 |
| SrO | 3–12 |
| BaO | 3–12 |
| PbO | 0.00 |
| $ZrO_2$ | 1–4 |
| $Co_3O_4$ | 0.2–2 |
| NiO | 2–19.47. |

15. A substrate according to claim 14 wherein the amount of $Co_3O_4$ ranges from 0.2 to 1 weight percent and the amount of NiO ranges from 2 to 10 weight percent.

16. A substrate according to claim 14 having the composition:

| Oxides | Weight Percent |
|---|---|
| $SiO_2$ | 35–60 |
| $Al_2O_3$ | 1.5–2.5 |
| $Na_2O$ | 5–10 |
| $K_2O$ | 5–9 |
| MgO | 0–0.5 |
| CaO | 1–2 |
| SrO | 5–10 |
| BaO | 5–10 |
| PbO | 0.00 |
| $ZrO_2$ | 2–3 |
| $Co_3O_4$ | 0.2–1 |
| NiO | 2–10. |

* * * * *